United States Patent [19]
Murata

[11] Patent Number: 5,988,845
[45] Date of Patent: Nov. 23, 1999

[54] UNIVERSAL UNIT FOR AUTOMATICALLY CONFIGURING THREE-DIMENSIONAL STRUCTURES OF A DESIRED SHAPE

[75] Inventor: Satoshi Murata, Tsukuba, Japan

[73] Assignee: Agency of Industrial Science & Technology, Ministry of International Trade & Industry, Tokyo, Japan

[21] Appl. No.: 08/944,781

[22] Filed: Oct. 6, 1997

[30] Foreign Application Priority Data

Oct. 8, 1996 [JP] Japan .................................. 8-285941

[51] Int. Cl.⁶ .................................................. G05B 15/00
[52] U.S. Cl. .................................. 364/131; 364/468.01
[58] Field of Search .................................. 364/468, 578, 364/131; 446/124; 29/898, 411; 74/469; 414/7

[56] References Cited

U.S. PATENT DOCUMENTS 4,109,398  8/1978  Hida .................................................. 35/13
4,964,062  10/1990  Ubhayakar et al. ..................... 364/513

*Primary Examiner*—William Grant
*Assistant Examiner*—Peter W. Eissmann
*Attorney, Agent, or Firm*—Oblon, Spivak, McClelland, Maier & Neustadt, P.C.

[57] ABSTRACT

A three-dimensional universal unit includes multiple identically configured assembly units, each having a central unit body, arms that can rotate relative to the unit body, the arms extending from the unit body in three orthogonal axes and having a connecting mechanism at the end of each arm. The assembly unit also has an information processing unit for controlling a motor in the unit body, an assembly unit operation, a rotary drive transmission system for transmitting arm drive motion from the motor, and a drive transmission system for engaging and disengaging the connecting mechanisms. Each connecting mechanism can mechanically connect with a connecting mechanism of another assembly unit and includes a communication device for exchanging information between information processing units of connected assembly units.

2 Claims, 6 Drawing Sheets

UNIVERSAL UNIT FOR AUTOMATICALLY CONFIGURING THREE-DIMENSIONAL STRUCTURES OF A DESIRED SHAPE

BACKGROUND OF THE INVENTION

1. Field of the Invention

The present invention relates to a universal unit for automatically configuring three-dimensional structures of a desired shape using only internally incorporated mechanisms. More particularly, the invention relates to a three-dimensional universal unit that can be used to configure automatically three-dimensional structures of a required shape such as three-dimensional structures located in extreme environments such as space, by making, breaking and reconfiguring connections among a plurality of identically structured assembly units without external assistance.

2. Description of the Related Art

In structures formed by connecting together many identical assembly units, changing the connective configuration, breaking connections and reconfiguring the assembly units, connecting, disconnecting and reconfiguring assembly units are normally made with the assistance of an external force. However, in extreme environments such as in outer space as well as in restricted spaces and the like where such an external helping force is not readily obtainable, such connection, disconnection and reconfiguration are difficult. Concerning this technical problem, multifunctional modules for mechanical configurations are disclosed in U.S. Pat. No. 5,452,199.

Structures formed by these modules are two-dimensional in shape. The modules each have an information processor and use electro-magnets to form connections with other modules, change the positions of connections, break connections by generating repulsive force. This capability enables the overall two-dimensional shape of a structure to be changed by sequentially changing connective relationships among neighboring modules. Thus, a structure of a desired two-dimensional shape can be formed by starting out from a desired two-dimensional connective configuration and changing the connective relationships. However, the ability to change two-dimensional shapes has very limited applicability. Instead, what is generally required is the ability to form desired three-dimensional structural configurations.

An object of the present invention is to provide a three-dimensional universal unit for forming three-dimensional structures in a desired shape. This object is accomplished by a plurality of assembly units that are able automatically to connect together as well as disconnect and reconfigure connections to self-assemble into the required three-dimensional structure.

SUMMARY OF THE INVENTION

To attain the above object, the present invention provides a three-dimensional universal unit having a plurality of assembly units each with a central unit body, six rotating arms that are rotatable relative to the unit body, said arms extending out from the unit body in three orthogonal axes and each arm having a connecting mechanism at an end thereof, an information processing unit for controlling an actuator in the unit body of each assembly unit and assembly unit operation, a rotary drive transmission system for transmitting arm drive motion from the actuator, and a disengageably engageable drive transmission system for engaging and disengaging the connecting mechanism, wherein each connecting mechanism can mechanically connect with a connecting mechanism of another assembly unit and includes communication devices for exchanging information between information processing units of connected assembly units.

Each unit body is provided with a motor that constitutes the actuator and drives each rotating arm and connecting mechanism via the clutches of the rotating drive transmission system that drives each rotating arm and the disengageably engageable drive transmission system that drives each connecting mechanism.

In the three-dimensional universal unit of this configuration, the connecting mechanism on the end of each rotating arm is used to connect and disconnect neighboring assembly units. By using these connecting mechanisms, numerous assembly units can self-assemble into a cubic lattice and form a three-dimensional universal unit of a desired overall shape.

An assembly unit connected to the main self-assembling structure by just one arm, with the other arms not connected, can be rotated by rotating the arm thus connected. As such, if an arm of the rotated assembly unit perpendicular to the axis of the arm thus rotated has been connected to the arm of another assembly unit, the result is that this other assembly unit is rotated about the above rotated arm. By effecting such rotation in units of 90 degrees and operating the connecting mechanisms on the end of rotating arms brought into opposition by the rotation, rotating arms can be connected together. By repeating this operation, the shape of a three-dimensional structure of assembly units can be changed to a target shape.

This operation is effected in accordance with instructions from the information processing unit of each assembly unit. Information can be exchanged between neighboring assembly units by communication device that each connecting mechanism is provided with. A plurality of assembly units can therefore be connected, disconnected and reconfigured to form automatically a desired three-dimensional structure without any outside assistance. Since each assembly unit is provided with just a single motor to actuate the rotating arms and connecting mechanisms, the assembly units can be made small and light and produced at low cost.

Further features of the invention, its nature and various advantages will be more apparent from the accompanying drawings and following detailed description of the invention.

DESCRIPTION OF THE PREFERRED EMBODIMENT

Figure 1:
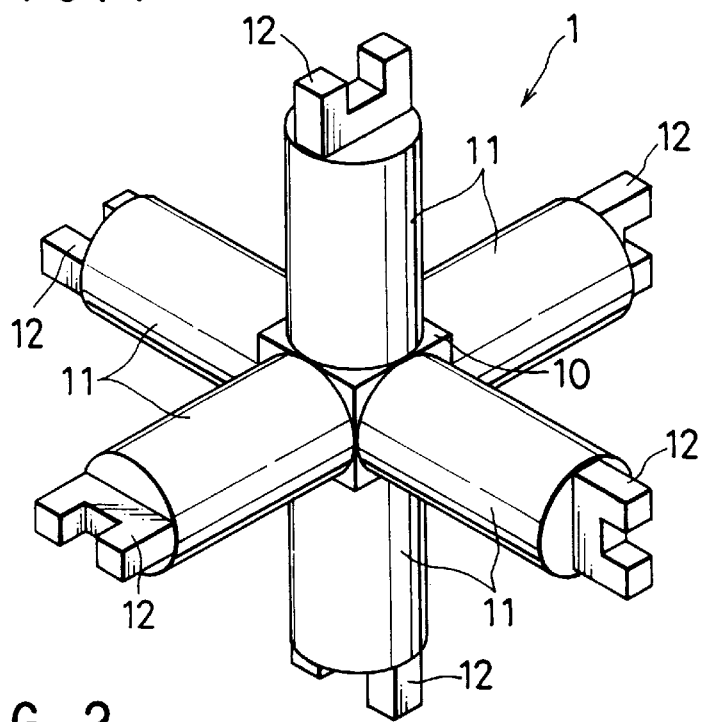
FIG. 1 is a perspective view of an assembly unit according to an embodiment of the present invention.

The drawings show the configuration of an embodiment of the three-dimensional universal unit according to this invention. FIG. 1 shows the configuration of an assembly unit 1, which includes a central unit body 10, six rotating arms 11 that extend from the unit body 10 along three orthogonal axes and can be independently driven, and a connecting mechanism 12 on the end of each of the rotating arms 11.

The unit body 10 will now be described in detail, with reference to FIGS. 2 to 7. The unit body 10 is provided with a motor 14 that serves as the actuator that operates the rotating arms 11 and the connecting mechanisms 12, an information processing unit 13 that controls operation of the assembly unit, a rotational drive transmission system 16 (FIG. 7) that enables each of the rotating arms 11 to be independently driven by the motor 14, and an engagement/disengagement drive transmission system 17 that enables the connecting mechanisms 12 to be operated by the motor 14. The connecting mechanism 12 allows the assembly unit 1 to be mechanically connected to another assembly unit; electrical contacts 42 and 43 in FIG. 5(a) on the connecting mechanisms 12 make contact when the connecting mechanisms 12 are engaged, allowing information to be exchanged between the information processing units 13 of connected assembly units 1, and also allowing electrical power to be supplied via linked assembly units 1. The wiring to the contacts 42 and 43 is not shown.

In the arrangement shown in FIG. 1, the connecting mechanisms 12 are U-shaped, but this is just an example of a typical configuration that may be used. Insofar as the connecting mechanisms 12 are capable of effecting mechanical connection between assembly units 1 and allowing communication of information between the information processing units 13 of the connected assembly units 1, there is no specific limitation on the configuration of the connecting mechanisms 12. Other means may be used to supply electricity to the assembly units 1.

The operation of the connecting mechanisms 12 and the engagement/disengagement drive transmission system 17 will now be described with reference to FIGS. 2 to 5. The motor 14 that generates the torque required to drive the rotating arms 11 and the connecting mechanisms 12 is disposed within housing 20 of the unit body 10. The engagement/disengagement drive transmission system 17 used to drive the connecting mechanisms 12 includes elements such as belt, gears and clutch comprising the system that delivers the output of the motor 14. The motor 14 may be a reversible servo motor or the like.

Figure 2:
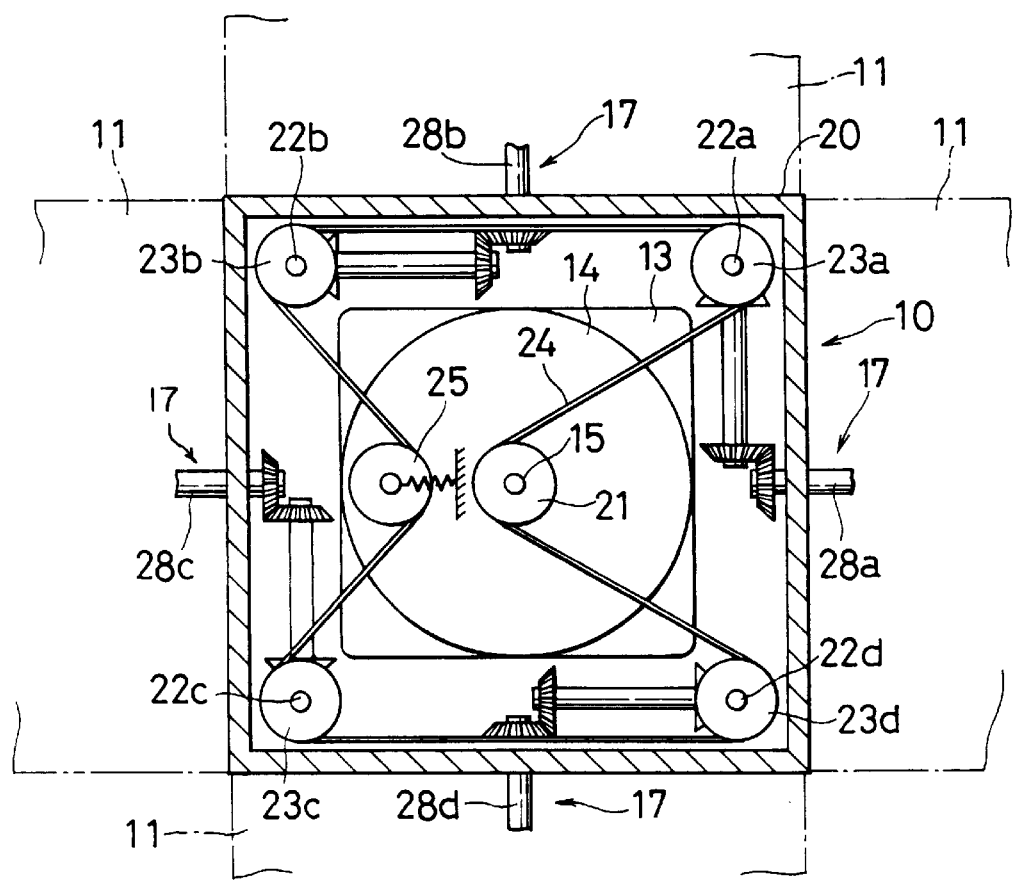
FIG. 2 is a cross-sectional view of the body of the assembly unit of FIG. 1.
Figure 3:
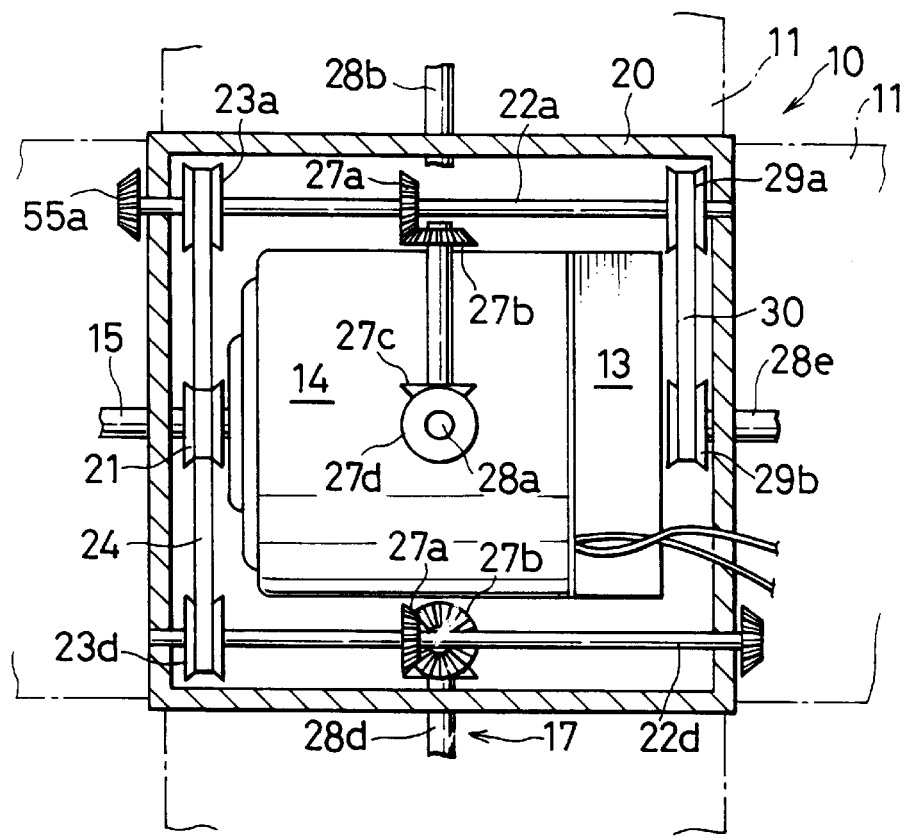
Fig. 3 is a side cross-sectional view of the unit body shown in FIG. 2.

In FIGS. 2 and 3, a pulley 21 is fixed on the output shaft 15 of the motor 14, and four main transmission shafts 22a to 22d are rotatably supported in the corners of the housing 20 parallel to the output shaft 15. A belt 24 is mounted around the pulley 21 and pulleys 23a to 23d affixed to the main transmission shafts, forming a belt transmission mechanism for driving the main transmission shafts 22a to 22d.

To enable the rotation provided by the motor 14 to operate the connecting mechanisms 12, as shown in FIG. 2, each of shafts 28a to 28d is rotatably supported in the center of each of the four sides of the housing 20 parallel to the output shaft 15. The shafts 28a to 28d are driven by the main transmission shafts 22a to 22d via helical gears 27a to 27d in FIG. 3. On the side of the housing 20 from which the output shaft 15 projects, the output shaft 15 is used as is shown, while on the opposite side to the output shaft 15, a shaft 28e is rotatably supported to be driven by the main transmission shaft 22a via pulley 29a, belt 30 and pulley 29b. The shafts 28a to 28e and the output shaft 15 are arranged to rotate at substantially the same speed.

Figure 4:
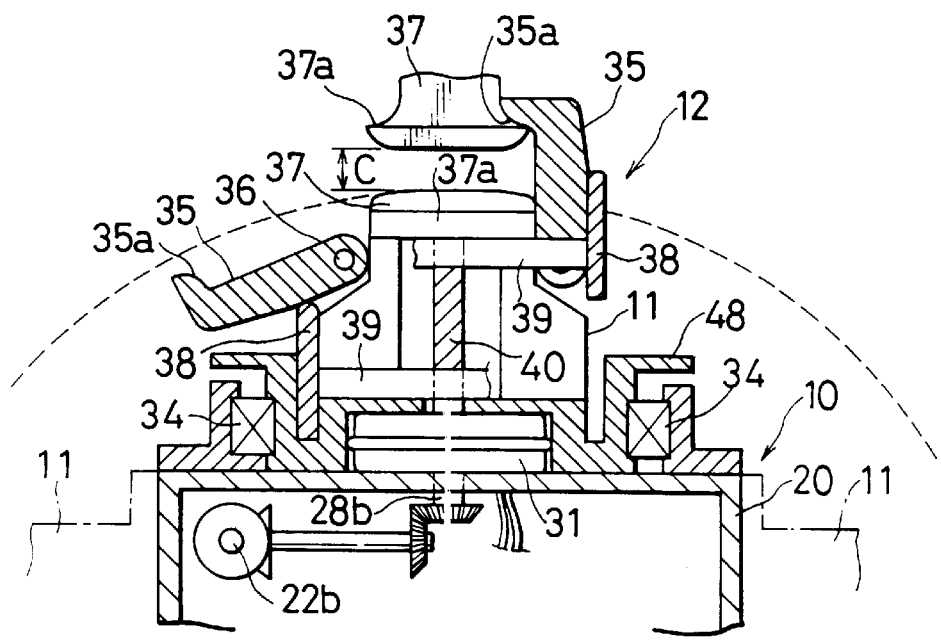
FIG. 4 is a cross-sectional view of the drive system used to engage and disengage the connecting mechanism at the end of each rotating arm in the assembly unit shown in FIG. 1.

The shafts 28a to 28e and the output shaft 15 will now be explained with reference to FIGS. 4 and 5. The connecting mechanisms 12 are operated to engage and disengage via an electromagnetic clutch 31. The rotating arms 11 shown in FIG. 4 are shown as being much shorter than in the other drawings. This arrangement is just to show that the rotating arms 11 can be short. As shown in FIG. 4, the rotating arm 11 is mounted on the housing via a ball bearing 34 that allows the rotating arm 11 to rotate about its axis. The connecting mechanisms 12 used to connect the rotating arms 11 of adjacent assembly units together are each comprised of a pair of connecting hands 35 pivotally supported by a pivot shaft 36 at each side of a head 37 of the rotating arm 11. The connecting hands 35 are urged open by a spring (not shown). Each connecting hand 35 is provided with a hook portion 35a for engagement with a lip portion 37a on the head 37.

When a connecting ring 38 provided around the rotating arm 11 is moved along toward the tip of the rotating arm 11, it presses the spring inward, locking the connecting hands 35 and the rotating arm 11 by bringing the hook portions 35a of the connecting hands 35 into engagement with the lip portions 37a. Moving the connecting ring 38 back along the rotating arm 11 releases the pair of connecting hands 35, allowing the hands 35 to open out under the force of the spring and thereby breaking the engagement between the hook portions 35a and the lip portions 37a.

Figure 5A:
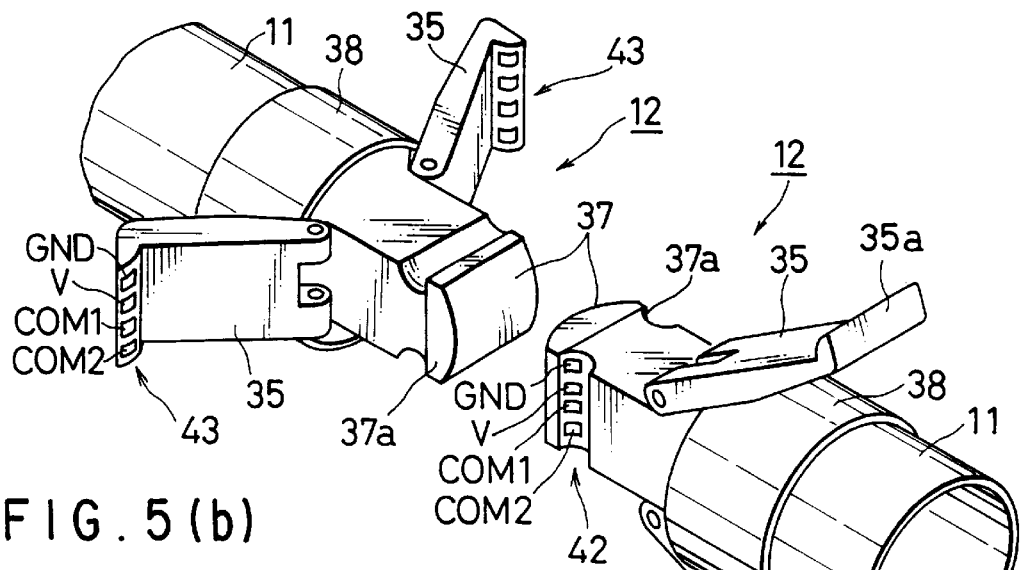
FIG. 5(a) is a perspective view showing a pair of the connecting mechanisms of FIG. 4, in the open state.
Figure 5B:
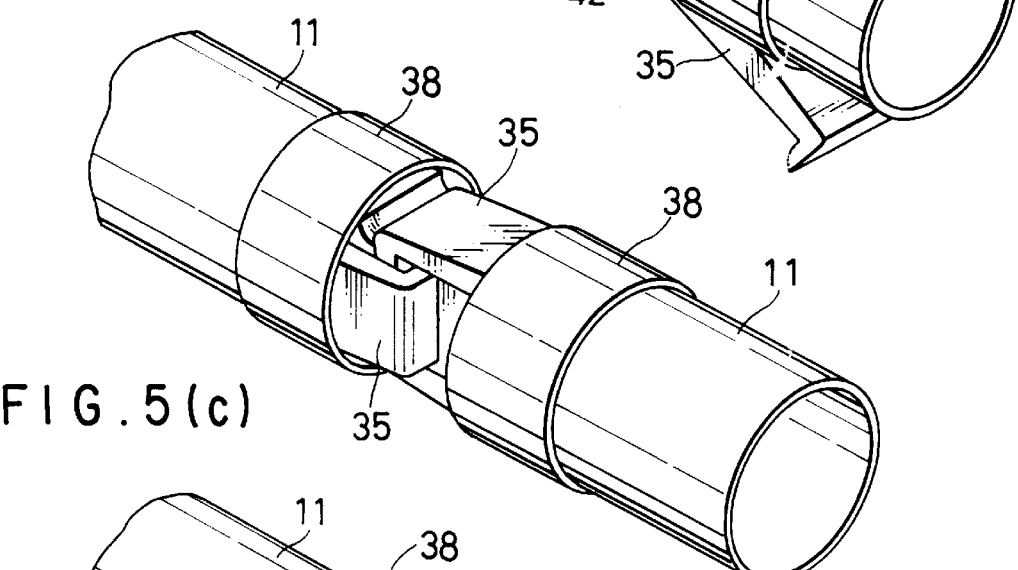
FIG. 5(b) is a perspective view showing the connecting mechanisms of FIG. 5(a) gripping each other.
Figure 5C:
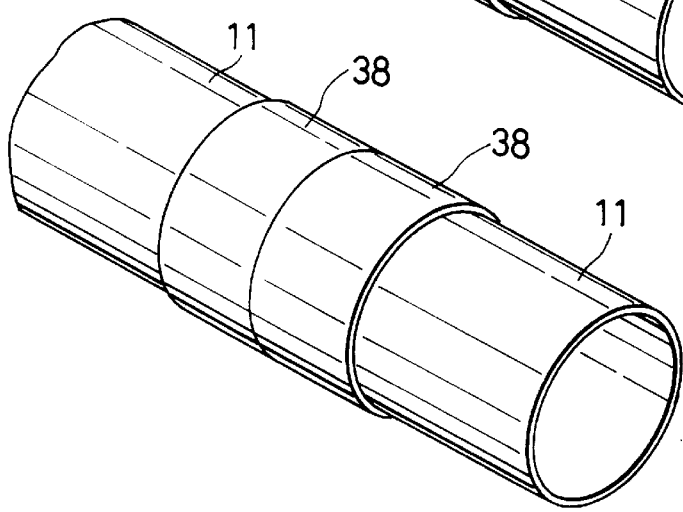
FIG. 5(c) is a perspective view showing the abutment between rotating arms of FIG. 5(b) connected together.

The left half of FIG. 4 and FIG. 5(a) show the connecting hands 35 in the freed state, when the connecting ring 38 has been moved back toward the base of the rotating arm 11 (in the drawings the heads 37 are shown separated), and the right half of FIG. 4 and FIG. 5(b) show when the connecting ring 38 is moved to the end of the rotating arm 11, whereby the connecting hands 35 are locked into engagement with the head 37 on the adjacent assembly unit. By sliding the ring 38 further forward than the position shown in FIG. 5(b), the rings 38 of the two arms 11 are brought into abutment, completing the connection. This arrangement imparts a high rigidity to the connection portion.

With reference to FIG. 4, the shaft 28b is associated with a feed screw 40 via the electro-magnetic clutch 31, to enable the connecting ring 38 to be moved axially as required by transmitting rotation to the feed screw 40. Specifically, this movement is done by a screw feed mechanism formed by threaded engagement between the feed screw 40 and a nut provided on a ring drive plate 39. The tip of the feed screw 40 is rotatably supported at the tip of the rotating arm 11. When the feed screw 40 is rotated by engaging the electromagnetic clutch 31, the ring drive plate 39 is moved along the axial line of the rotating arm 11, thereby also moving the connecting ring 38 along the outer face of the rotating arm 11 to open or close the connecting hands 35.

The connecting mechanism 12 on the end of each of the rotating arms 11 is for joining adjacent assembly units together. As shown in FIGS. 5(a) and 5(b), the two connecting hands 35 on one rotating arm 11 are perpendicular to the two connecting hands 35 on the other rotating arm 11 to allow each pair of connecting hands 35 to grip the head 37 of the other rotating arm 11. The dimensions of each part are set so that when a pair of rotating arms 11 are connected together, there is a prescribed clearance C in FIG. 4 between the heads 37 thereof. This space is provided for facilitating rotation of unit bodies 10 by the rotating arms 11.

While the connecting mechanism 12 is thus used to effect a mechanical connection with the connecting mechanism 12 of other assembly units 1, the connecting mechanisms 12 also include communication means for allowing information exchange to take place between the information processing units 13 of FIGS 2 and 3 for connected assembly units, and allowing electricity to be supplied to each assembly unit 1. In the illustrated arrangement of FIG. 5(a), these means are electrical contacts 42 and 43 provided on the lip portions 37a of the head 37 and the hook portions 35a of the connecting hands 35 that engage with the lip portions 37a. However, other communication means may be used.

Information exchanged via the communication means is mainly information required for assembly units to automatically form, break and reconfigure connections with other assembly units to enable numerous assembly units to automatically self-assemble into a desired configuration. Specifically, information is exchanged between information processing units of adjoining assembly units relating to control of operations for making and breaking connections between rotating arms.

The configuration of the rotational drive transmission system 16 used to drive the rotating arms 11 will now be described with reference to FIGS. 6 and 7. The left and right halves of FIG. 6 are cross-sectional views of different locations.

The rotational drive transmission system 16 includes the elements such as belt, gears, reduction mechanism (worm gear) and clutch to comprise a system for transmitting the output of the motor 14 to the rotating arms 11. In the illustrated arrangement of FIGS. 2 and 3, the same motor 14 that is used to operate the connecting mechanisms 12 is used to operate the rotational drive transmission system 16 in FIGS. 6 and 7. However, it is not a requirement that just one motor be used. Instead, separate motors may be used to drive the connecting mechanisms 12 and the rotating arms 11. Also, any actuator may be used in place of the motor.

Figure 6:
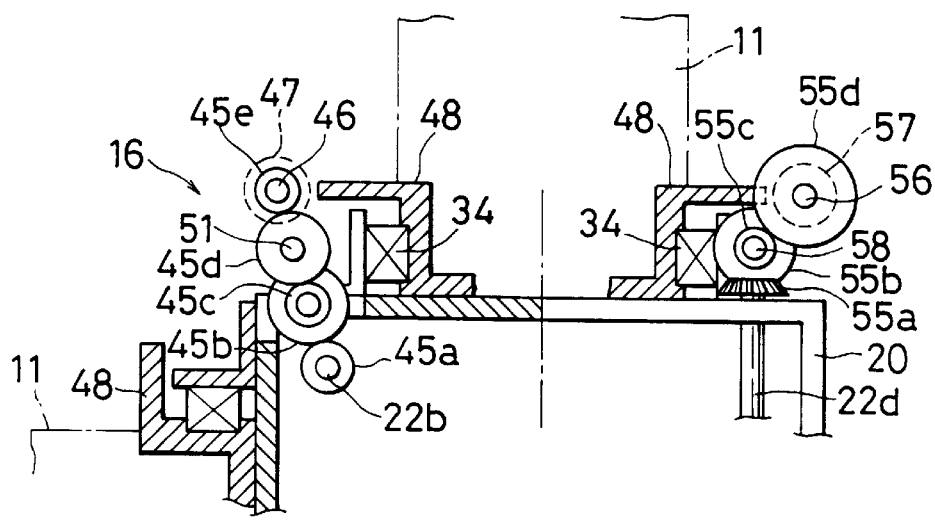
FIG. 6 is a cross-sectional view of the drive transmission system for driving the rotating arm shown in FIG. 5(c)
Figure 7:
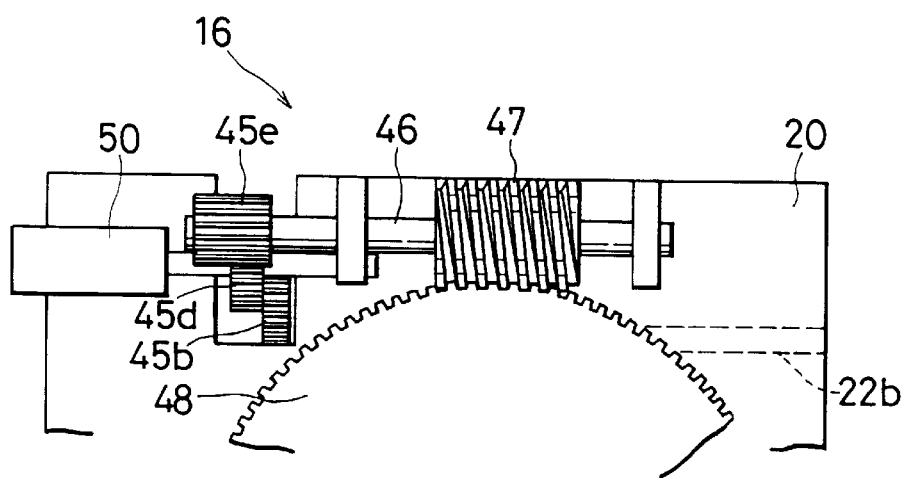
FIG. 7 is a plan view of the main parts of the rotating arm drive transmission system shown in FIG. 6.

As shown in the left half of FIG. 6 and in FIG. 7, the rotation of a main transmission shaft 22b driven by the motor via a belt drive mechanism is communicated to a worm gear shaft 46 by a gear train comprised of gear wheels 45a to 45e. A worm gear 47 on the worm gear shaft 46 meshes with a worm wheel 48 at the base of the rotating arm 11 rotatably supported on the housing 20 via the ball-bearing 34. Gear wheel 45d is mounted on the shaft 51 of a solenoid 50 constituting the clutch mechanism, whereby operating the solenoid 50 causes the gear wheel 45d to disengage from the gear wheel 45c.

As shown in the right half of FIG. 6, the rotation of a main transmission shaft 22d, driven by the motor via a belt drive mechanism is communicated to a worm gear shaft 56 by helical gears 55a and 55b and spur gears 55c and 55d. A worm gear 57 on the worm gear shaft 56 meshes with the worm wheel 48 at the base of the rotating arm 11 rotatably supported on the housing 20 via the ball-bearing 34. Helical gear 55b and spur gear 55c are mounted on a shaft 58 of a solenoid (not shown) constituting the clutch mechanism, and when the solenoid is operated, the helical gears 55a and 55b are disengaged. As long as disengagement by the solenoid is maintained, the motion of the motor 14 is not communicated to the rotating arm 11. When either solenoid is operated, the rotation of the motor 14 is transmitted to worm gear 47 or 57, rotating the arm 11 about its axis.

A desired three-dimensional structural configuration can be assembled by connecting numerous assembly units into the type of cubic lattice arrangement shown in FIGS. 8 and 9. As described below, connections among the assembly units can be changed, broken and reconfigured to enable a three-dimensional structure to be automatically assembled without external assistance, making the invention applicable to three-dimensional structures located in extreme environments, such as outer space.

Figure 8A:
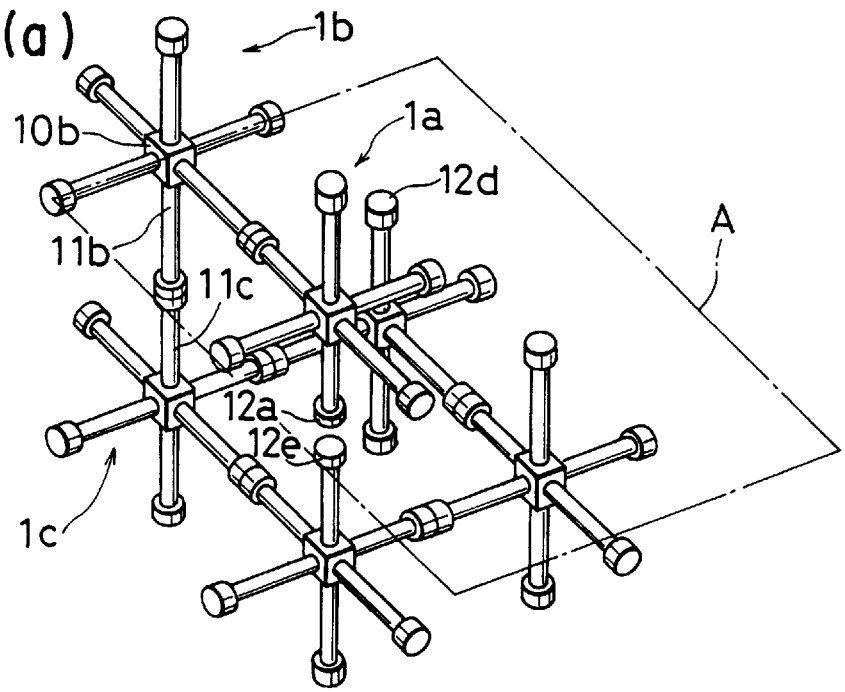
FIG. 8(a) and 8(b) are drawings illustrating horizontal motion of an assembly unit according to the present invention.
Figure 8B:
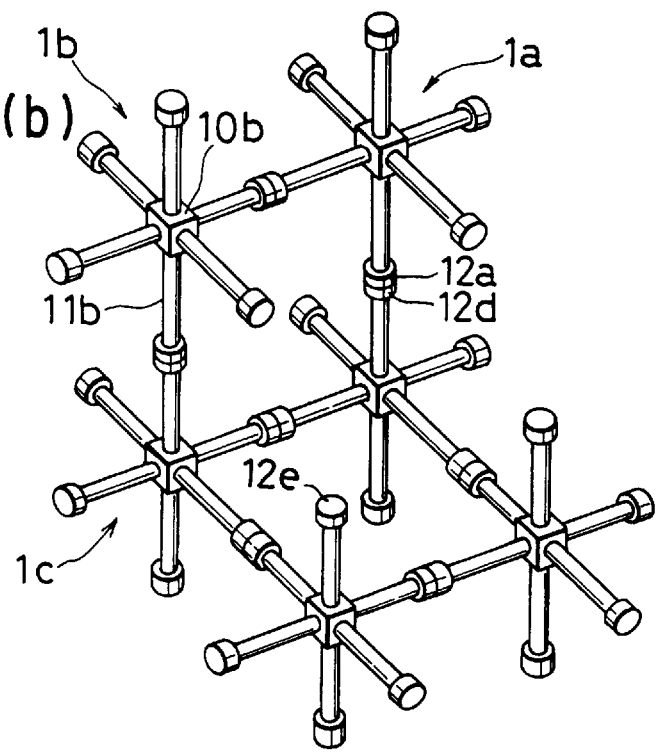

FIGS. 8(a) and 8(b) are used for explaining movement of an assembly unit 1a on an upper level (plane A) of a two-level arrangement comprised by numerous assembly units. As shown in FIG. 8(a), the connection between connecting mechanisms 12a and 12e is cut and rotating arm 11b of assembly unit 1b is rotated 90 degrees by unit body 10b of assembly unit 1b, thereby moving assembly unit 1a to the location shown in FIG. 8(b), at which the connecting mechanisms 12a and 12d are connected. In this way, an assembly unit can be moved to any position on the plane A and the structural configuration changed without changing other parts of the three-dimensional structure. The configuration of the assembly units can be changed by repeating the operation.

Figure 9A:
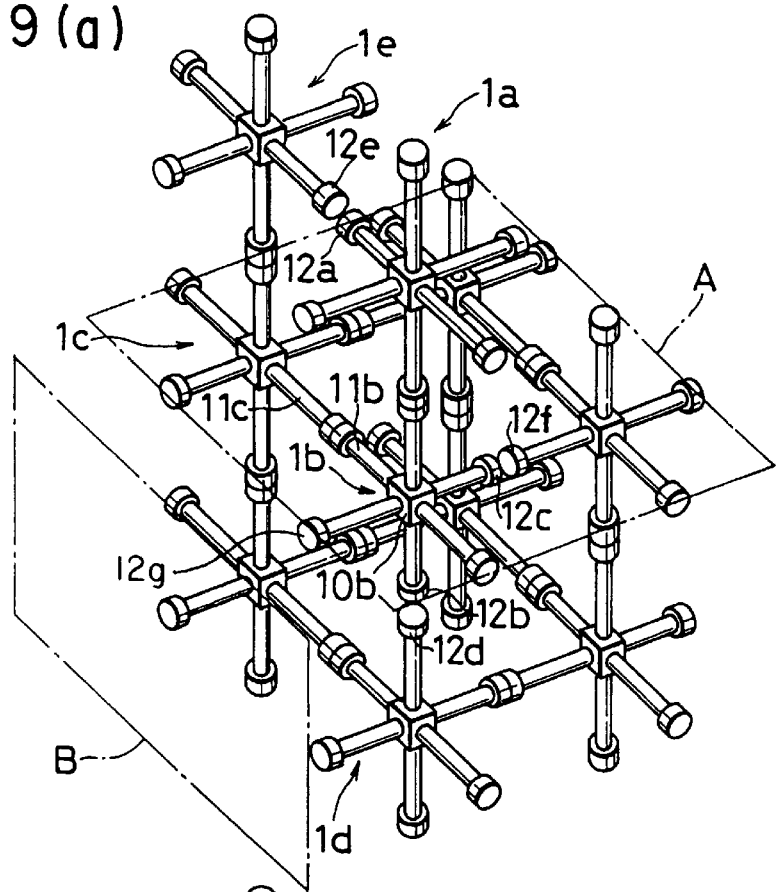
FIG. 9(a) and 9(b) are drawings illustrating vertical motion of an assembly unit according to the present invention.
Figure 9B:
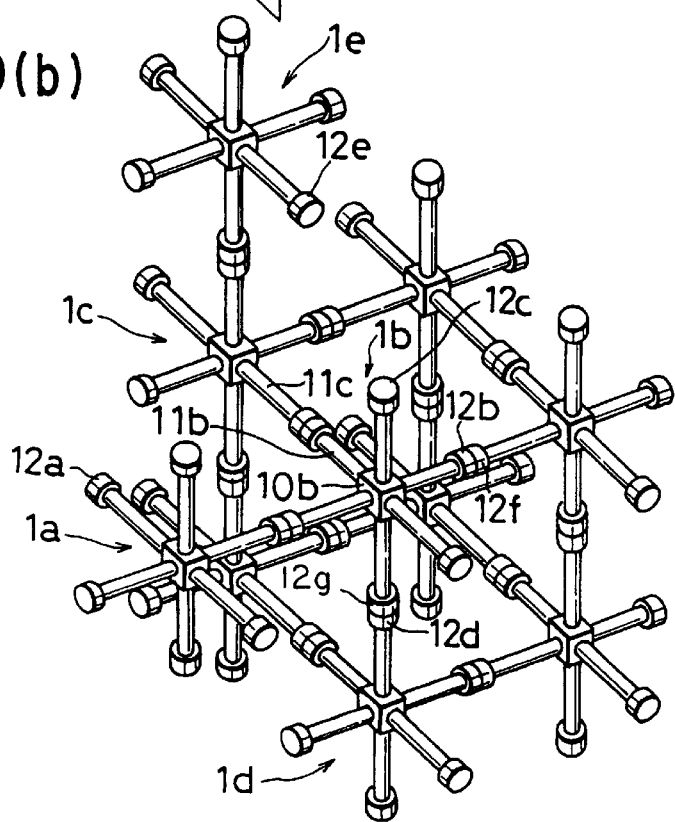

FIGS. 9(a) and 90(b) are used for explaining movement of an assembly unit 1a between the top level (plane A) and a vertical plane (plane B) perpendicular to plane A in a three-level arrangement of assembly units. With reference to FIG. 9(a), the assembly unit 1a is moved from plane A to plane B by cutting the connections between connecting mechanisms 12a and 12e, between connecting mechanisms 12b and 12d, and between connecting mechanisms 12c and 12f, and then rotating the arm 11b of assembly unit 1b 90 degrees by unit body 10b of assembly unit 1b. This rotation moves the assembly unit 1a to the location shown in FIG. 9(b), and the relocation is completed by joining connecting mechanism 12g to connecting mechanism 12d, and connecting mechanism 12b to connecting mechanism 12f. By combining the operations described with reference to FIGS. 8 and 9, the assembly units can be organized into various three-dimensional structures.

Thus, numerous identically structured assembly units can be configured to form three-dimensional structures of a desired shape by making, breaking and reconfiguring connections among the assembly units without external assistance. Therefore, if part of a three-dimensional structure of such units located in outer space is damaged, the damaged part can be restored to the prescribed condition by moving spare assembly units to the damaged location, and assembly units can also automatically form three-dimensional structures of a desired shape under the control of the information processing units.

As described in the foregoing figures, the three-dimensional universal unit according to the present invention can connect a plurality of assembly units together without outside assistance, and can break and reconfigure the connections to configure automatically numerous assembly units into desired three-dimensional structures.

What is claimed is:

1. A three-dimensional universal unit comprising:
   a plurality of assembly units each with a central unit body having an actuator therein, rotating arms that are rotatable relative to the unit body and extend out from the unit body in three orthogonal axes, and a connecting mechanism provided at an end of each arm;

an information processing unit for controlling operation of the actuator in the unit body of each assembly unit and for controlling operation of the assembly unit;

a rotary drive transmission system for transmitting arm drive motion from the actuator; and a disengageably engageable drive transmission system for engaging and disengaging the connecting mechanism;

wherein each connecting mechanism is mechanically connectable with a connecting mechanism of another assembly unit and includes a communication device for exchanging information between information units of connected assembly units; and wherein one of the arms of a first assembly unit is rotatably connected to a second assembly unit, at least one of the remaining arms of the first assembly unit is connected to a third assembly unit, and said one of the arms of the first assembly unit rotates to move the third assembly unit to a prescribed new position;

such that the three-dimensional universal unit connects the plurality of assembly units together without outside assistance, breaks and reconfigures connections to configure automatically numerous assembly units into desired three-dimensional structures.

2. The three-dimensional universal unit according to claim 1, wherein the actuator in each unit body is a motor that drives each rotating arm and each connecting mechanism via clutch mechanisms of the rotary drive transmission system and the disengageably engageable drive transmission system.

* * * * *